June 14, 1955   E. G. OVERMAN   2,710,575
FRANKFURTER BARBECUE SPIT
Filed Oct. 15, 1953
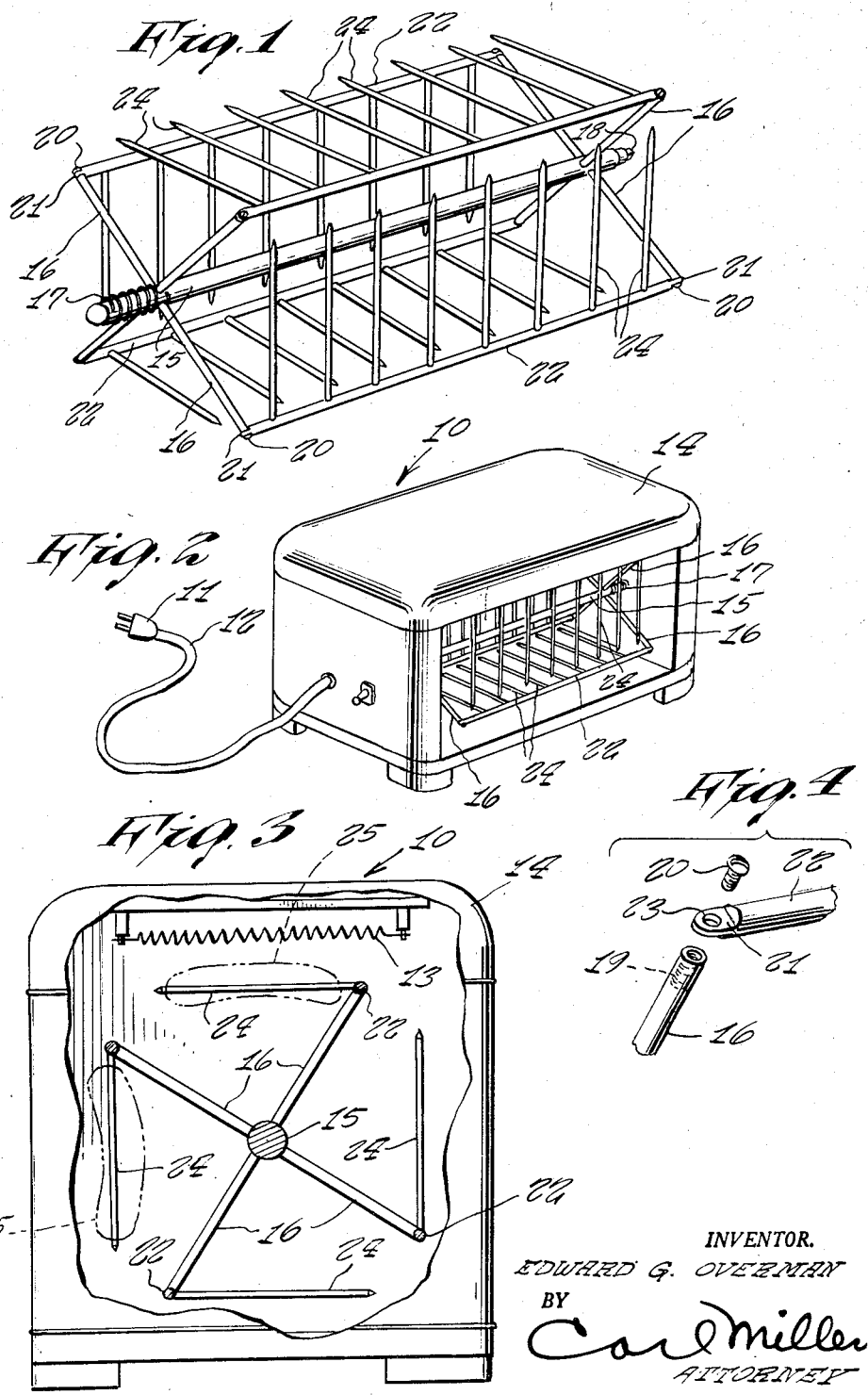
INVENTOR.
EDWARD G. OVERMAN
BY
Carl Miller
ATTORNEY

2,710,575

FRANKFURTER BARBECUE SPIT

Edward G. Overman, Broad Channel, N. Y.

Application October 15, 1953, Serial No. 386,215

4 Claims. (Cl. 99—421)

This invention relates to frankfurter barbecue spits.

It is an object of the present invention to provide a frankfurter barbecue spit of improved design wherein the entire length of the frankfurter is evenly heated.

Other objects of the present invention are to provide an improved frankfurter barbecue spit bearing the above object in mind which is of simple construction, inexpensive to manufacture, has a minimum number of parts, is easy to use and efficient in operation.

For other objects and a better understanding of the invention, reference may be had to the following detailed description taken in connection with the accompanying drawing, in which:

Figure 1 is a perspective view of a frankfurter barbecue spit embodying the features of the present invention;

Fig. 2 is a perspective view of an electric roaster showing the invention incorporated therein;

Fig. 3 is an end view, partly in section and partly in elevation of the roaster and spit and Fig. 4 is an enlarged exploded perspective view of one end of the spit.

Referring now to the figures, 10 represents an electric roaster adapted to be connected to a source of power by means of a male plug 11 and insulated cord 12 and having the usual electric heating coils 13 (Fig. 3) mounted below the top 14. The electric roaster 10 also includes the usual motor at one end, not shown, which receives one end of the barbecue spit whereby to rotate the same.

In the practice of my invention, the central shaft 15 of the barbecue spit is provided near each end with the cross bars 16, the cross bar 16 being disposed at substantially right angles to each other (Fig. 3). The central shaft 15 at one end is provided with the usual spring 17 to fit within the roaster bearing and at the other end is provided with the angular extension 18 which fits within the rotating bearing of the motor. The cross bars 16 at each end are provided with internally threaded openings 19 (Fig. 4) into which are received the screws 20, the flat end 21 of longitudinal connecting elements 22 having an opening 23 through which passes the screws 20 whereby to secure the bars 22 in the position shown. A plurality of longitudinally spaced prongs 24 are secured at one end to each of the bars 22, the other ends of the prongs 24 being pointed and adapted to receive thereon the frankfurters 25 (Fig. 3).

It will be noted that when the cross bars 16 are in the position of Fig. 3, the uppermost spits or prongs 24 are substantially parallel to the heating coil 13, permitting the entire length of the frankfurter 25 to be evenly heated in an improved manner. This even heating is achieved by the disposition of the cross bars 16 relative to each other and by the disposition of the prongs 24 relative to the longitudinal bars 22, the prongs 24 being disposed at substantially right angles to each other. Thus, as the spit is rotated in the usual manner, the hot dogs 25 will be heated evenly over their entire length instead of being overheated in localized areas as is the case with conventional frankfurter barbecue spits.

While various changes may be made in the detail construction, it shall be understood that such changes shall be within the spirit and scope of the present invention, as defined by the appended claims.

Having thus set forth and disclosed the nature of my invention, what is claimed is:

1. A frankfurter barbecue spit comprising a central elongated shaft adapted at each end to be rotatably mounted in an electric roaster having a longitudinally disposed heating element at one side thereof, a pair of intersecting cross bars near each end of said central shaft, said cross bars being disposed at substantially right angles to each other, longitudinal bars connecting the ends of said cross bars, and longitudinally spaced prongs provided along each of said longitudinal bars, the said prongs of each of the said longitudinal bars being disposed at a substantially right angle to the prongs of the adjacent longitudinal bars, so that each of the said prongs extends parallel to the said heating element of the said roaster at one time of its rotation.

2. A frankfurter barbecue spit according to claim 1, said cross bars at each end having internally threaded openings, said longitudinal bars at each end having perforated flat portions adapted to be aligned with said internally threaded openings and screws passing through said flat portions into said internally threaded openings.

3. A frankfurter barbecue spit according to claim 2, said central shaft at one end being formed with an angular extension adapted to be received within an angular bore rotated by the roaster motor, the other end of said shaft extending beyond said cross bars, and a spring sleeving said other end.

4. A frankfurter barbecue spit according to claim 3, the angle between said prongs and said cross bars being adapted to evenly heat the entire length of a frankfurter disposed thereon during operation of the electric roaster.

References Cited in the file of this patent

UNITED STATES PATENTS

| | | |
|---|---|---|
| 2,039,541 | Lekometros | May 5, 1936 |
| 2,144,918 | Garvis | Jan. 24, 1939 |
| 2,545,818 | Larkin | Mar. 20, 1951 |